Oct. 10, 1961  M. MELOY  3,003,613
CONVEYOR FLIGHT
Filed May 13, 1958
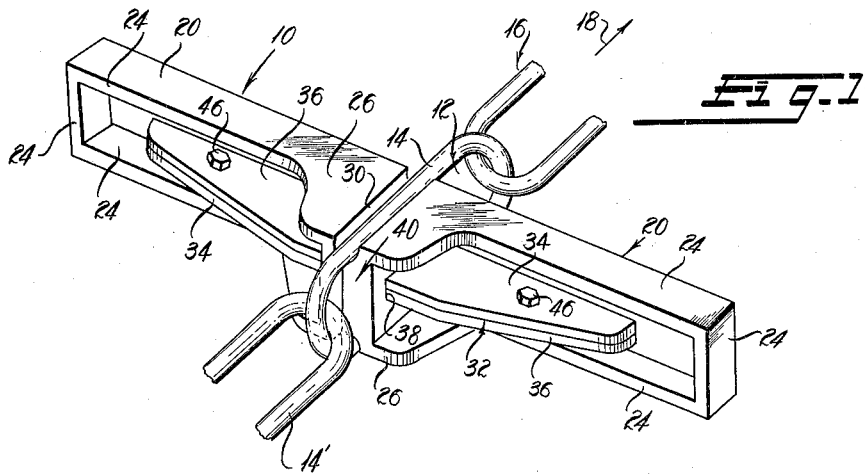
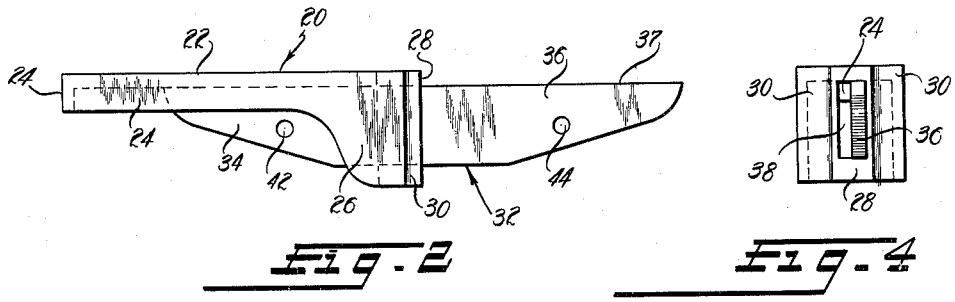
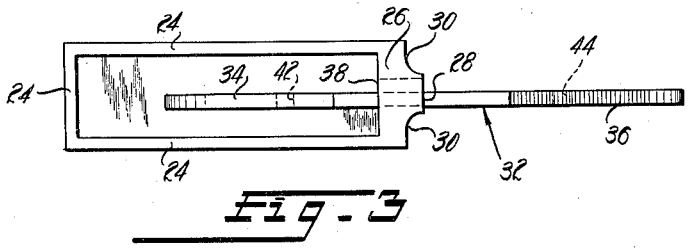
INVENTOR
MARSHALL MELOY
BY Strauch, Nolan & Neale
ATTORNEYS

3,003,613
CONVEYOR FLIGHT

Marshall Meloy, Seattle, Wash., assignor to Bellingham Chain & Forge Company, Seattle, Wash., a corporation of Washington
Filed May 13, 1958, Ser. No. 735,022
5 Claims. (Cl. 198—176)

This invention relates to novel conveyor flight assemblies, and more particularly to the types of conveyor flights mounted in chain link openings on an endless conveyor chain. Such conveyors are generally used for moving heavy bulky materials through a trough. The conveyor flights of this invention are particularly suited for use in the logging industry since they possess a uniquely high strength-to-weight ratio.

In the past, conveyor flights have been assembled from identical halves secured together by suitable bolts. An example of this type of construction is found in U.S. Patent No. 2,409,318, issued October 15, 1946.

The primary disadvantages of prior constructions in which the load stresses are borne by the bolts or rivets holding the two halves together, are that the bolts or rivets are subjected to high shearing stresses which often cause their failure. Other arrangements where a substantial portion of the load forces are transmitted directly to the link can't be used with links of standard construction.

A primary object of this invention is therefore to provide a novel chain conveyor flight assembly made of identical halves which are interconnected together in opposed relation to each other in such a manner as to provide increased strength and rigidity.

It is another object to provide conveyor flight components that can be quickly and easily assembled in operative position in an opening of any chain link of a size suitable for the conveying operation in which it is to be used.

Another object of this invention is to provide a chain conveyor flight component half for use in an assembly comprising identical component halves which can be economically manufactured by either casting, forging or fabricating.

It is a further object to provide improved flight assemblies having novel abutting bracket portions where the flight is mounted in the chain link to provide maximum strength and stiffness in the central portion of the assembly where maximum stresses are transmitted from the flight assembly to the chain link thereby making it possible to reduce bulk in other sections of the flight to result in an over-all lighter construction without loss of strength.

A further object of this invention is to provide a conveyor flight assembly made of identical halves connected by bolts or rivets and having novel cooperating beam bracer bars extending from each half respectively and bearing on the opposite half of the assembly so that substantially all load stresses in the conveyor flight assembly are transmitted through said beam bracer bars to an opposing surface on the other half, and the connecting bolts or rivets do not carry any substantial load.

Other objects and advantages of the invention will become apparent from the following detailed description and drawing, in which:

FIGURE 1 is a perspective view of the conveyor flight of this invention comprising identical halves mounted in assembled relation through the opening of a link in a chain suitable for use in a continuous chain conveyor;

FIGURE 2 is a side elevation of a component half used in assembling the flight conveyor of FIGURE 1;

FIGURE 3 is a bottom view of the component half of FIGURE 2; and

FIGURE 4 is an end elevation of the flight half illustrated in FIGURE 2.

Referring now more specifically to the drawings, there is illustrated in FIGURE 1 a conveyor flight assembly indicated generally at 10 mounted in an opening 12 of a link 14 of an endless conveyor chain indicated generally at 16 which in normal conveying operation moves in a direction indicated by the arrow 18.

The conveyor flight assembly 10 comprises a pair of identical component halves detachably interconnected together so as to be locked in the opening 12 of chain link 14. Each of the component halves comprise a material carrying arm indicated generally at 20 having formed on one side thereof a flat material carrying surface indicated generally at 22 and on the opposite side thereof peripheral reinforcing ribs 24 disposed in substantially normal relation to material carrying surface 22. Ribs 24 are enlarged adjacent an end of material carrying surface 22 to form a transverse bracket indicated generally at 26 having an end face surface 28 intersecting material carrying surface 22 at substantially right angles thereto. A pair of spaced parallel grooves 30 are formed in the length of opposite sides of end face surface 28 adjacent outer edges thereof, the grooves 30 being adapted to receive opposed sections of chain link 14 slidably fitting therein along its pitch dimension when the end face surfaces 28 of each component half are abutting each other as illustrated in FIGURE 1.

A beam bracer bar indicated generally at 32 has a section comprising about half its length indicated at 34 rigid with arm 20 on the side thereof opposite from material carrying surface 22 with the remaining length of beam bracer bar 32 as indicated at 36 extending longitudinally from arm 20 in substantially normal relation to the end face surface 28. An opening 38 having substantially the same configuration as a central cross-section of bracer bar 32 is provided through bracket portion 26 and end face surface 28 adjoining beam bracer bar 32 and is adapted to receive therethrough extension 36 from an opposed arm 20 or component half as illustrated in FIGURE 1. Each arm 20 has a surface adjacent section 34 of arm 32 and opposite the opening 38 on which a load bearing edge indicated at 37 on extension 36 can bear when a load is applied to the material carrying surfaces 22 by moving the conveyor flight assembly 10 in the direction of the arrow 18 as shown in FIGURE 1.

When arms 20 are mounted in assembled relation in link 14 the bottom surfaces of brackets 26 form a load bearing surface 40 against which an end of an adjoining connecting link 14 of chain 16 abuts when a load is applied to the material carrying surfaces 22. Thus all the load bearing stresses within the conveyor flight assembly 10 are borne by beam bracer bars 32 with the load on the assembly 10 being transmitted to the chain 16 by load bearing surface 40.

The beam bracer bar 32 has a pair of spaced holes 42 and 44 in the sections 34 and 36 respectively which are spaced equidistantly from end face surface 28. Thus when the arms 20 are interconnected into a conveyor flight assembly as illustrated in FIGURE 1, hole 44 of one beam bracer bar will be aligned with hole 42 of an adjacent bracer bar to provide through bores for receiving either rivets or nuts and bolt assemblies 46. These components need not be of high strength materials as is the case in those conveyor flight assemblies in which such connecting members carry all or a substantial portion of the load developed during operation of the conveyor.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A chain conveyor flight assembly comprising a pair of substantially identical halves, each half comprising an arm having a material carrying surface on a side thereof, a chain engaging bracket integral with said arm extending across an end thereof in a direction away from said material carrying surface, said bracket having a flat face in full surface engagement with the corresponding surface on the opposite flight half, a beam bracer bar having a section comprising substantially half its length rigid with said arm on a side thereof opposite from said material carrying surface with the remaining section thereof extending longitudinally from said arm and through said bracket, a pair of substantially parallel grooves extending along the lateral edges of said bracket, said grooves extending substantially normal to said material carrying surface and adapted to receive therein opposite sections of a chain link, an opening through said bracket adjacent a side of said beam bracer bar surrounding and supporting a section of the beam bracer bar of the other flight half in a manner such that the section of the beam bracer bar projecting through said bracket opening is positioned adjacent a side of the section of beam bracer bar rigid with said arm, the section of each beam bracer bar projecting through said bracket opening having surfaces respectively bearing against said arm and against the side of said opening facing said arm when a load is applied to said material carrying surfaces, and means for detachably locking the halves of said conveyor flight assembly together.

2. The assembly of claim 1 in which the means for locking the halves of said conveyor flight assembly together comprises a bore in said beam bracer bar through the section rigid with said arm and a bore through the remaining section extending from said bracket, said bores being so positioned that when said halves are assembled together the respective bores in each section are aligned with the bores in the opposite adjacent beam bracer bar sections, and means extending through said bores locking the assembled halves together.

3. A conveyor comprising a chain having a plurality of interconnecting links with openings therethrough and a conveyor flight assembly mounted in an opening of one of said links, said conveyor flight assembly comprising a pair of substantially identical halves detachably connected together, each half comprising a material carrying arm having a bracket extending across an end thereof, each bracket having an outer end face abutting the corresponding end face of the other half, a pair of spaced grooves in each end face surface mating with the grooves in the opposite end face, the chain link in which said conveyor flight assembly is mounted having opposed sections fitting in said mating grooves, reinforcing ribs integrally joining the marginal edges of said arm and said bracket thereby reinforcing said bracket, a beam bracer bar extending from the end face of each of said brackets, an opening through each bracket adjacent said beam bracer bar through which the beam bracer bar of each half extends, said opening being of substantially the same size and configuration as the portion of the beam bracer bar of the other flight half which it surrounds and supports, and means securing the two halves of the assembly together.

4. A chain conveyor flight member comprising a member having a top material carrying surface and an undersurface, a chain engaging bracket rigid with one end of said member and extending away from said material carrying surface in a direction substantially normal thereto, said bracket having a flat surface portion extending from end to end thereof, chain engaging grooves extending along the lateral edges of said bracket, a bar rigid with said undersurface of said plate-like member and extending along a substantial portion thereof, said bar also being rigid with and projecting beyond said bracket, said bar having a load bearing surface on its projecting portion engageable with the undersurface of the member of an identical flight member and said bracket having an opening of the same size and shape as the adjacent portion of said bar and adapted to surround and support the bar of an identical flight member.

5. A chain conveyor flight member comprising an arm having a material carrying surface on one side thereof, a chain engaging bracket integral with said arm extending transversely across an end thereof in a direction away from said material carrying surface, said bracket having a flat outer end face intersecting said material carrying surface at substantially right angles thereto, the outer edges of said bracket having arcuate recesses for receiving a chain link, ribs rigid with the marginal edges of said arm and extending away from said material carrying surface, the ends of said ribs being rigid with the opposite side edges of said bracket to provide a reinforcement therefor, a beam bracer bar rigid with said arm and extending longitudinally therefrom through said bracket a distance substantially half of the length of said bar in substantially normal relation to said end face, and means defining an opening through said bracket adjacent said bar adapted to surround and support a like beam bracer bar of a second conveyor flight member.

References Cited in the file of this patent
UNITED STATES PATENTS

| | | |
|---|---|---|
| 1,583,614 | Smith | May 4, 1926 |
| 2,490,239 | Sivyer | Dec. 6, 1949 |
| 2,595,703 | Price | May 6, 1952 |
| 2,889,916 | Price | June 9, 1959 |